(No Model.) 8 Sheets—Sheet 1.

A. PFAFF.
CASH REGISTER AND INDICATOR.

No. 524,836. Patented Aug. 21, 1894.

Witnesses.
S. W. Brainard.
Geo. S. Gleason.

Inventor:
Albert Pfaff
by Edward Rector
his atty.

(No Model.) 8 Sheets—Sheet 2.
A. PFAFF.
CASH REGISTER AND INDICATOR.
No. 524,836. Patented Aug. 21, 1894.
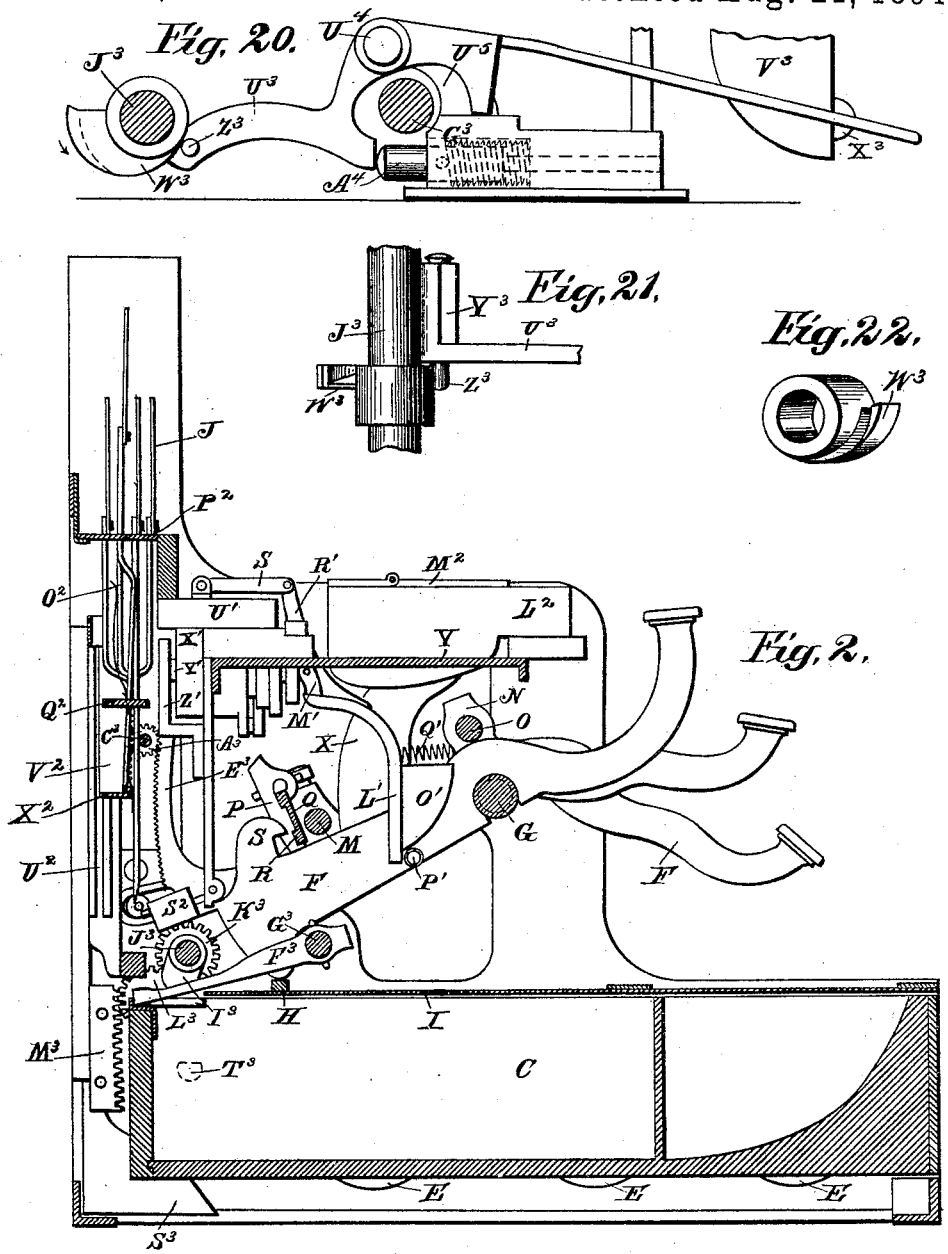

(No Model.)　　　　　　　　　　　　　　　　　8 Sheets—Sheet 3.
A. PFAFF.
CASH REGISTER AND INDICATOR.
No. 524,836.　　　　　　　　　　Patented Aug. 21, 1894.
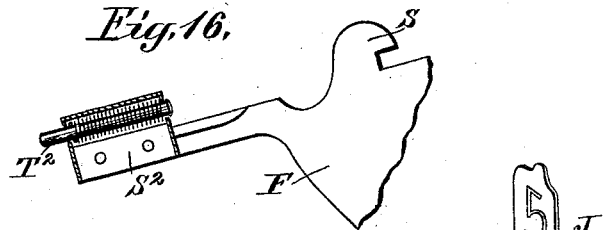
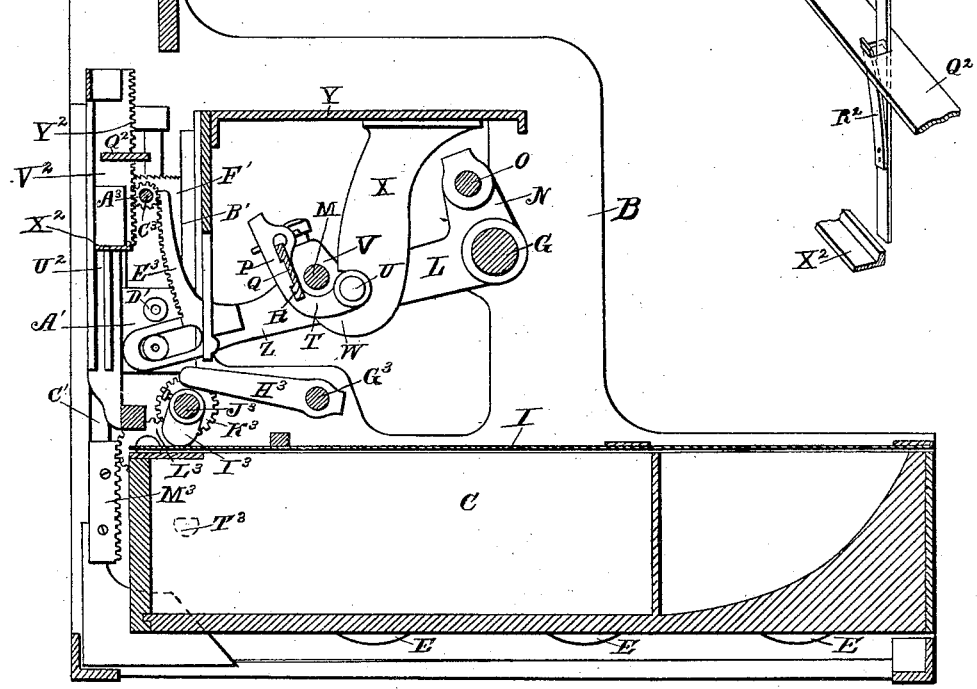
Witnesses.
S. H. Brainard.
Geo. S. Gleason.
Inventor:
Albert Pfaff
by Edward Rector
his atty (No Model.) 8 Sheets—Sheet 4.

A. PFAFF.
CASH REGISTER AND INDICATOR.

No. 524,836. Patented Aug. 21, 1894.

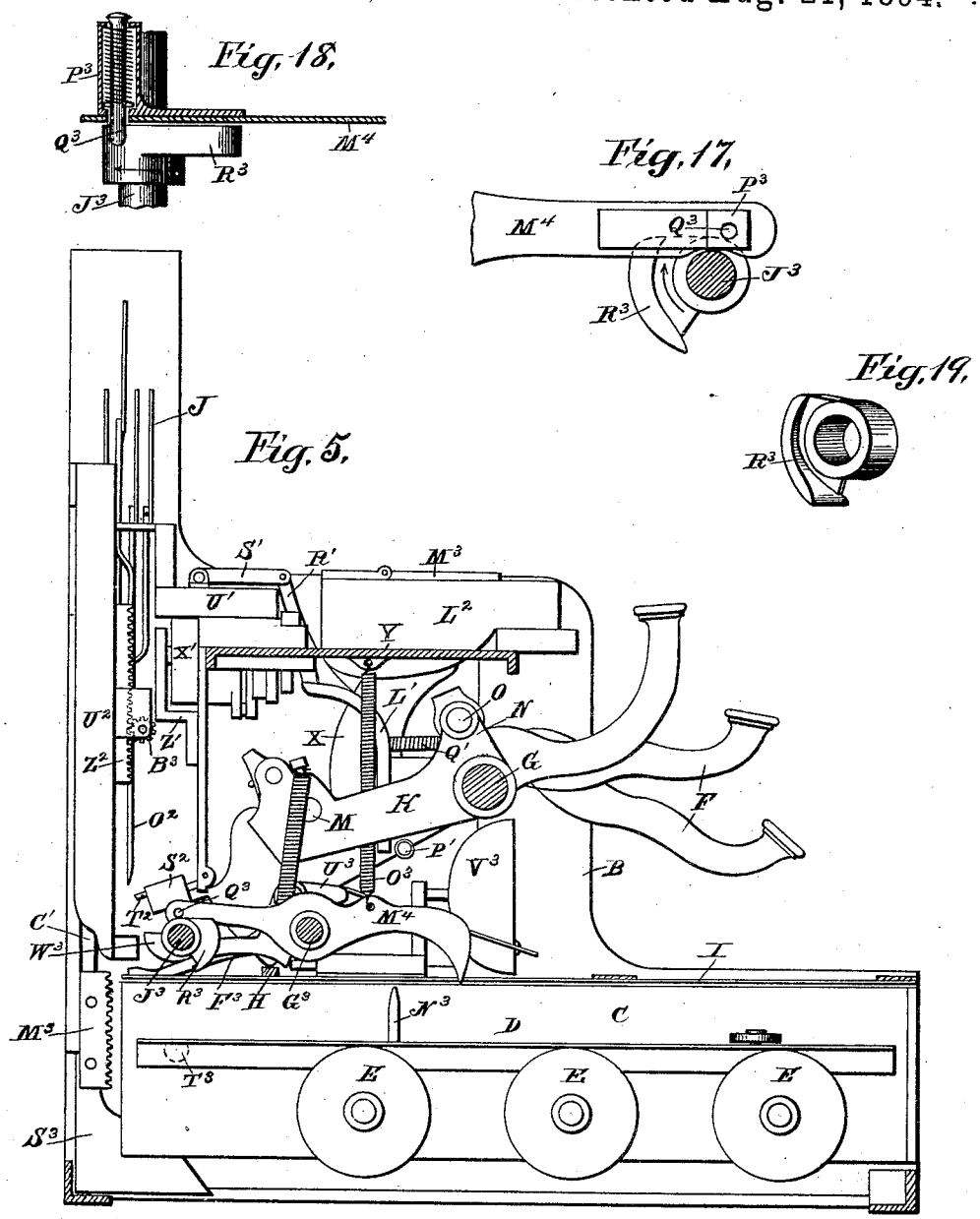

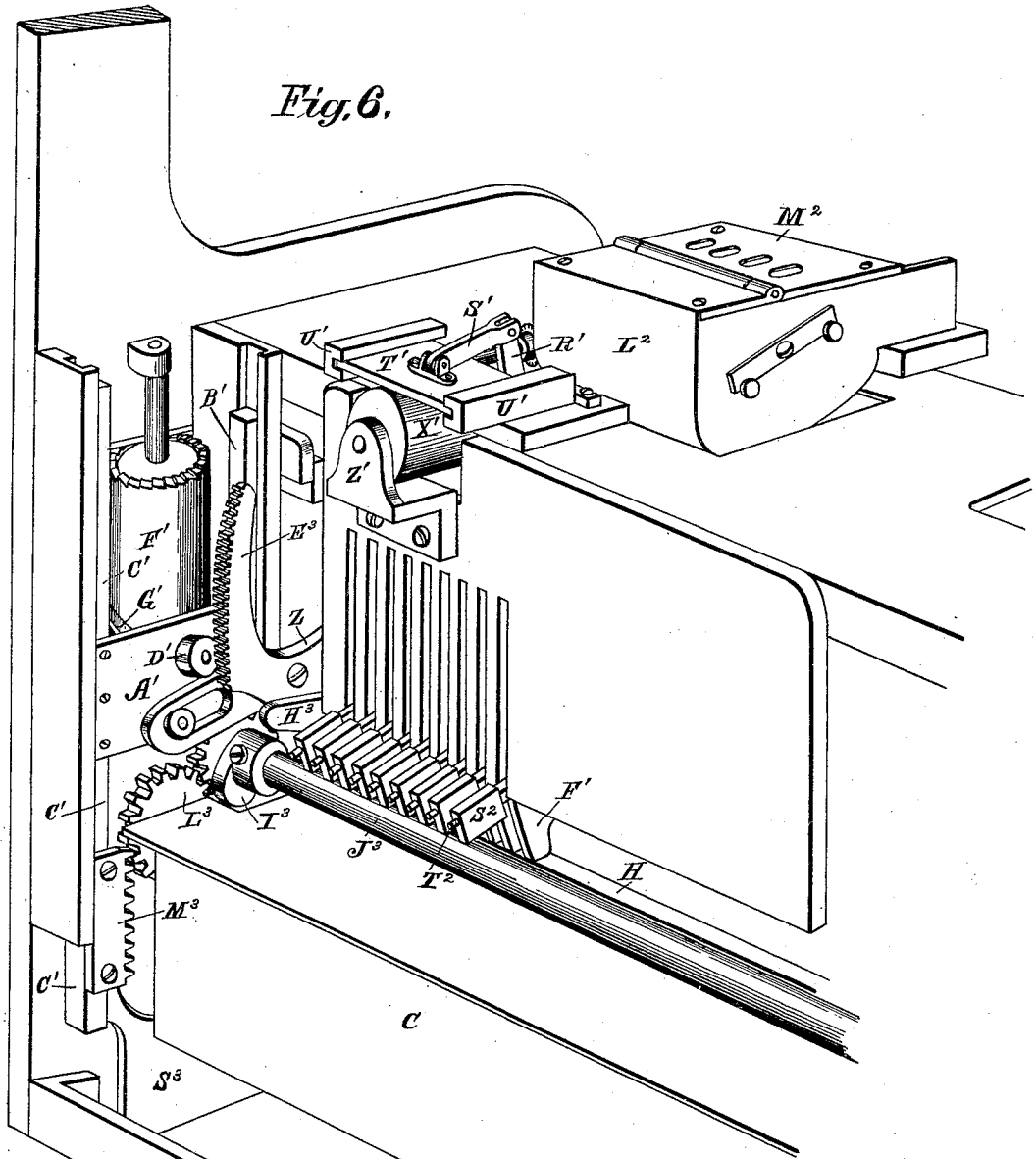

(No Model.)  8 Sheets—Sheet 7.

A. PFAFF.
CASH REGISTER AND INDICATOR.

No. 524,836.  Patented Aug. 21, 1894.

Witnesses,
S. W. Brainard.
Geo. S. Gleason.

Inventor:
Albert Pfaff
by Edward Rector
his atty (No Model.) 8 Sheets—Sheet 8.
A. PFAFF.
CASH REGISTER AND INDICATOR.
No. 524,836. Patented Aug. 21, 1894.
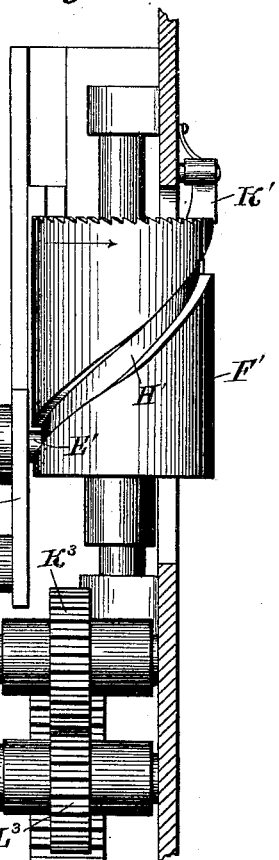
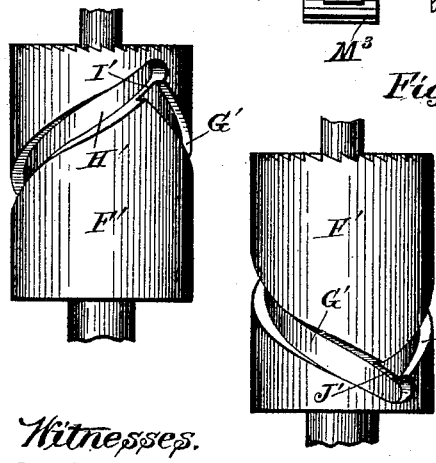
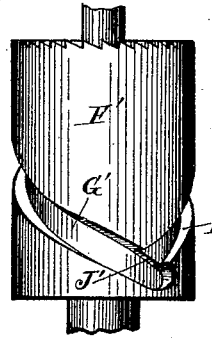
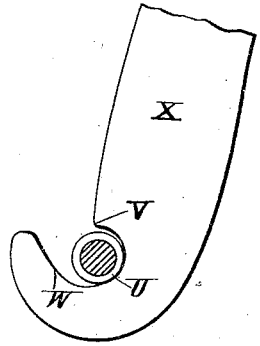
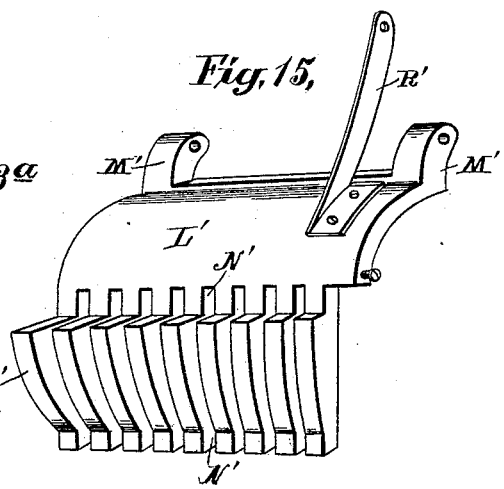
Witnesses.
S. W. Brainard.
Geo. S. Gleason.
Inventor:
Albert Pfaff
by Edward Rector
his atty.

UNITED STATES PATENT OFFICE.

ALBERT PFAFF, OF DAYTON, OHIO, ASSIGNOR TO THE NATIONAL CASH REGISTER COMPANY, OF SAME PLACE.

CASH REGISTER AND INDICATOR.

SPECIFICATION forming part of Letters Patent No. 524,836, dated August 21, 1894.

Application filed February 13, 1894. Serial No. 500,015. (No model.)

*To all whom it may concern:*

Be it known that I, ALBERT PFAFF, a citizen of the United States, residing at Dayton, in the county of Montgomery and State of Ohio, have invented a certain new and useful Improvement in Cash Registers and Indicators, of which the following is a description, reference being had to the accompanying drawings, forming part of this specification.
My invention relates more particularly to machines such as those shown and described in Letters Patent of the United States Nos. 505,553 and 505,554, granted to William Koch, and in the accompanying drawings is shown applied to a machine of that character, but its several features are not restricted in their broader scope to any particular style of machine and may be utilized in widely differing ones.
The novelty of the invention consists in certain new constructions, arrangements and combinations of elements, and certain new modes of operation, which will be hereinafter more fully described and particularly pointed out in the claims.

Figure 1:
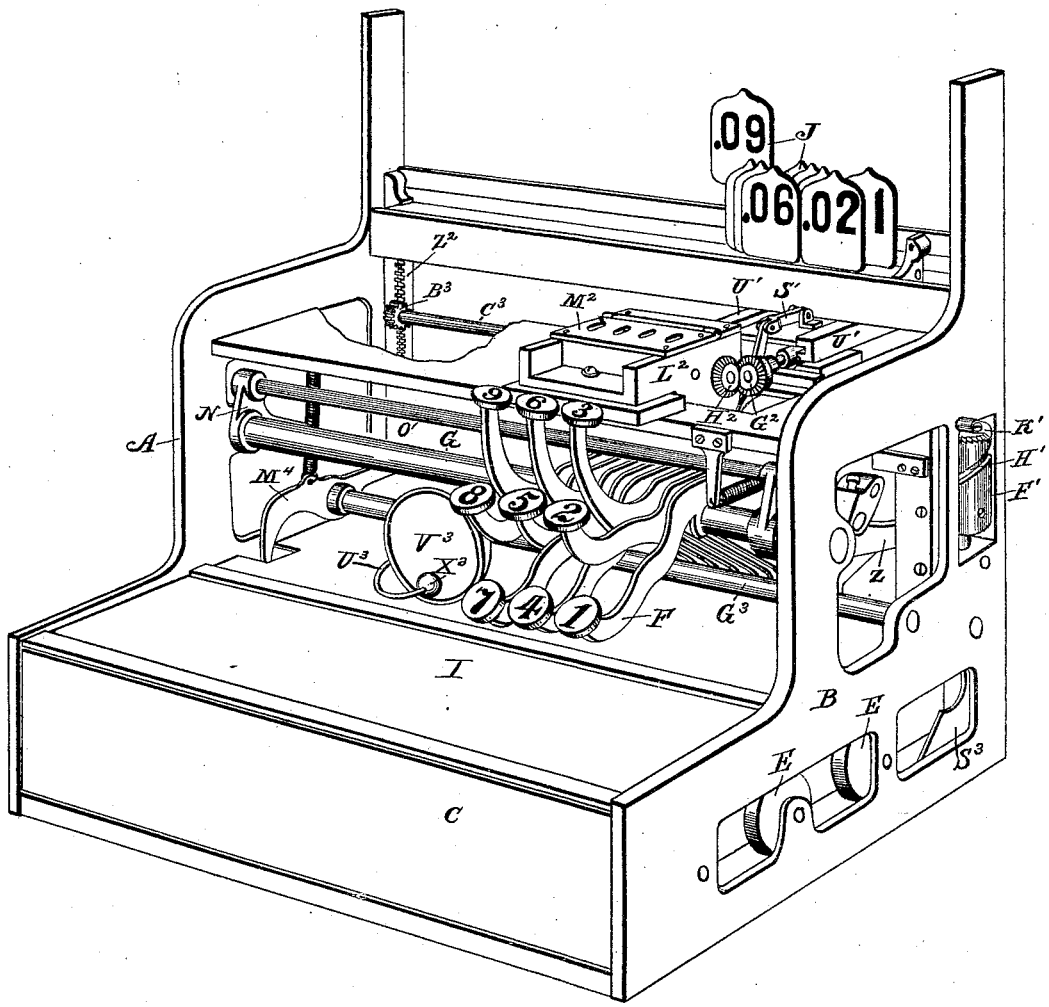
Figure 4:
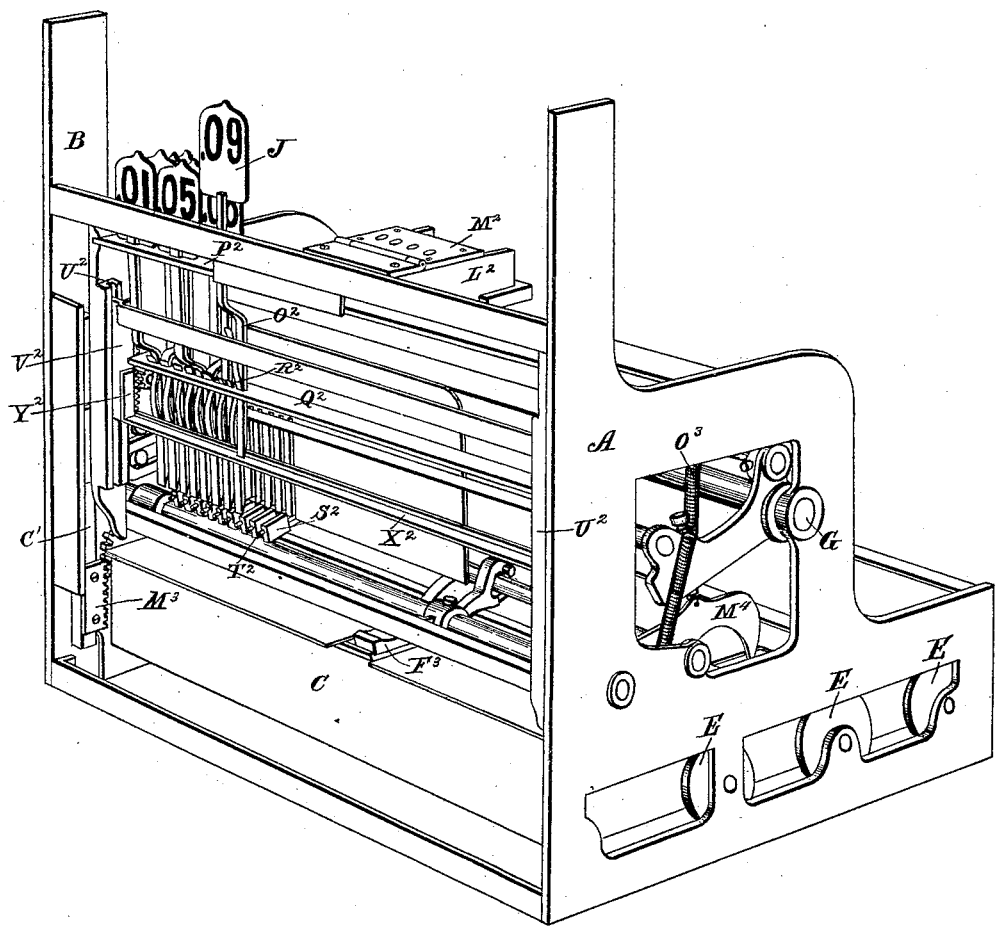
Figure 8:
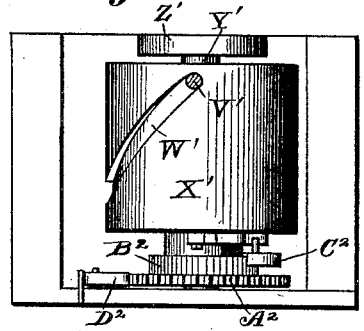
Figure 7:
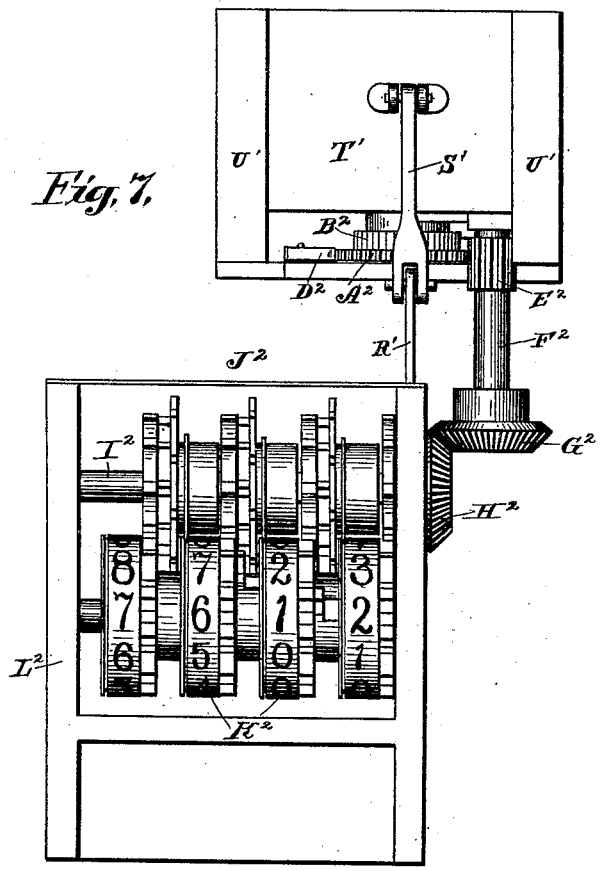
Figure 9:
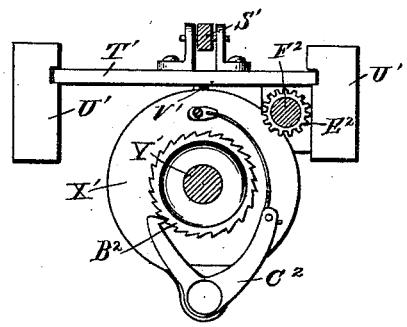
Figure 10:
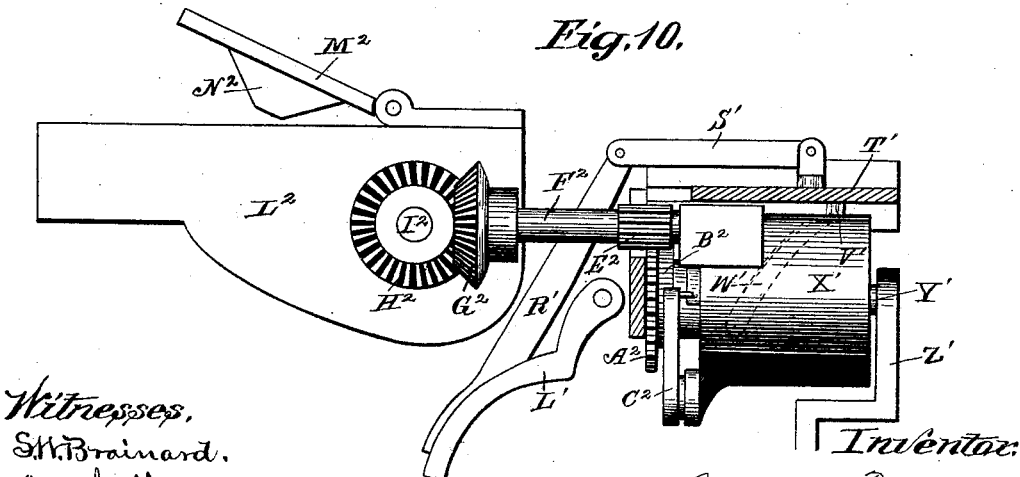

In the accompanying drawings Figure 1 is a perspective view of a machine embodying my invention, with the casing and all but one set or bank of keys and their co-operating indicating and registering devices removed, looking at the forward right hand corner of the same; Fig. 2 a middle vertical section of the machine, looking toward the right; Fig. 3 a vertical cross-section in a plane at the right of the bank of keys shown, looking toward the right; Fig. 3$^a$ a perspective view of one of the indicators; Fig. 4 a rear perspective view of the machine; Fig. 5 a vertical cross section just within the left hand side plate of the framework; looking toward the right side of the machine; Fig. 6 an enlarged perspective detail of the rear right hand corner of the machine with the indicating mechanism removed; Fig. 7 an enlarged detail plan view of the registering wheels and connected parts; Fig. 8 a corresponding view of the registering drum; Fig. 9 a detail vertical section showing a front elevation of said drum, the pawl carried by it, and the ratchet engaged by the pawl; Fig. 10 an enlarged detail side elevation of said drum, the register and intermediate parts; Fig. 11 an enlarged detail side elevation of the cam grooved cylinder of the key-controlling mechanism, and associated parts; Fig. 12 a sectional detail showing the spring plunger which co-operates with the cam groove in said cylinder; Figs 13 and 13$^a$ detail views of the cylinder showing the shoulders at the junctions of the cam grooves; Fig. 14 a detail view of the cam plate of the key-coupling mechanism; Fig. 15 a perspective view of the graduated registering frame; Fig. 16 a detail view of the rear end of one of the keys, showing in section the housing containing the spring plunger; and Figs. 17 to 22 detail views of the cams upon the oscillating shaft and the levers and spring plungers co-operating therewith.

The same letters of reference are used to indicate identical parts in all the figures.

The main framework of the machine consists of the two side-plates A B with suitable connecting cross-rods, bars and plates, and has in its lower portion the usual drawer-compartment in which fits the forwardly and backwardly movable money-drawer C having fast upon its sides flanged plates D, Fig. 5, which rest upon supporting rollers E mounted upon the inner faces of the side plates A B.

The operating keys consist of levers F fulcrumed on a horizontal rod G in the forward part of the machine and resting near their rear ends upon a cross-piece H upon the sheet-metal top I of the drawer-compartment, Fig. 2.
Above the rear ends of the keys are mounted the vertically reciprocating indicators J, and intermediate the same and the front ends of the key levers the registering devices hereinafter described.

The machine may be equipped with as many sets or banks of operating keys as desired, each co-operating with its own set of indicating and registering devices, but all co-operating in common with the various other parts of the machine, such as the alarm mechanism, drawer opening devices, key arrester, &c. In the present instance the machine may be assumed to employ three such sets of keys, each containing nine keys, only the right hand or cents bank, however, being shown in the drawings.

The first feature of my invention relates to novel means for compelling full strokes of the operated keys, commonly known as the key-arrester or key-controlling devices, and the parts more particularly associated with this feature of the invention may be first described.

Hung upon the fulcrum rod G of the key levers, one at each side of the machine, are two rearwardly extending arms K L, Figs. 3, 4 and 5, whose rear ends are rigidly connected by a rod M which extends across all the key levers of the machine a short distance forward of their rear ends. Rigidly secured at its opposite ends in upwardly projecting ears N in the front ends of the arms K L is a second cross-rod O. The key-levers fit in circumferential grooves in their fulcrum shaft G, Fig. 2, and the rod O serves to prevent displacement of them therefrom.

The side arms K L and their front and rear connecting rods M O constitute a rigid frame hung upon the rod G, and when the front end of any key-lever is depressed and its rear end lifted it will engage the rear cross rod M of the frame and lift the latter, and, when the key is released its rear end and the frame will drop back to normal position. Hung between ears P projecting upwardly from the rear ends of the side arms K L of the frame, in rear of the rod M, is a swinging bar Q whose lower edge has a rearwardly projecting flange or shoulder R adapted to co-operate with hooks S upon the upper sides of the key levers Fig. 2.

Fastened to the right hand end of the bar Q is a forwardly extending arm T carrying an anti-friction roller U which co-operates with cam surfaces V W upon a plate X, Fig. 14, secured at its upper end to the cross-plate Y of the framework.

When the parts are in normal position the roller U fits in a recess in the lower end of the plate X between the cams V W and the latter holds the bar Q in forward position with its flange R out of engagement with the hooks upon the keys. As soon, however, as the swinging frame is lifted by the operation of a key far enough to carry the roller U above the cam W the cam V will swing the bar Q rearward and engage its flange R with the hook of the operated key and couple the latter to the swinging frame. The key will remain coupled to the frame until the parts have about completed their full upward and downward movement, whereupon, as the roller U contacts with and rides over the forward side of the cam W again, the bar Q will be swung forward and its flange disengaged from the hook of the key. This method of coupling the operated key to the swinging frame at the beginning of its movement and disconnecting it therefrom at the end of its movement is substantially the same as that employed in the Koch machines before referred to, and the novelty of this feature of my invention consists in the novel means which I have combined with the swinging frame for compelling full movements of it in each direction and thereby full strokes of the keys which are coupled to it. The novel means I employ for this purpose may be now described.

The right hand side arm L of the swinging frame has a rearward extension Z, Fig. 3, which is loosely connected at its rear end by a slot and pin to a vertically reciprocating plate A' secured to and carried by two vertically sliding bars B' C' fitting in guideways in the framework, Fig. 6. When the swinging frame is lifted by the depression of the front end of a key lever the plate A' and bars B' C' are slid upward, and when the key is released and the frame returns to normal position they slide downward.

Confined in a housing D' on the plate A' is a spring-pressed sliding rod or plunger E', Figs. 11 and 12, whose outer end fits in a cam groove in the surface of a vertically mounted rotated drum or cylinder F'.

The cam groove in the surface of the cylinder F consists of two helically shaped halves G' H', which join each other at an acute angle at the lower end of the cylinder and extend upward in opposite directions half way around the cylinder and join each other at a similar angle at the upper end of the cylinder upon the diametrically opposite side of the latter.

It will be seen that if the end of the plunger rod E' be resting in the groove at either junction of its two halves and it be slid parallel with the axis of the cylinder to the opposite end of the latter the cylinder will be turned a half revolution, and that upon sliding the rod back to the end of the cylinder from which it started it will travel through the other half of the groove and turn the cylinder an additional half revolution.

In the normal position of the parts in the machine the plunger rod E' rests in the groove at the lower junction of its two halves. When it is lifted by the operation of a key it will travel upward through the half G' of the groove and turn the cylinder a half revolution in the direction of the arrow, and upon the downward movement of the rod, during the return stroke of the key, it will travel through the half H' of the groove and turn the cylinder a second half revolution.

At the junction of their upper ends the half H' of the groove is slightly deeper than the half G', thereby forming a shoulder I' at the termination of the half G', Fig. 13, while at the junction of their lower ends the half G' is slightly deeper than the half H', thereby forming a shoulder J' at the termination of the half H', Fig. 13ª. The purpose of these shoulders is to prevent the plunger rod E' from moving backward in the same half of the groove in which it has moved forward. Thus, when the rod moves upward it travels through the half G' and as it reaches the end of such half and clears the shoulder I' its spring presses it behind said shoulder into the deeper half H' of the groove. When the rod moves downward, during the return of the parts, the shoulder I' will prevent its reentering the half G' and force it into the half H'. So, when it reaches its normal position and clears the shoulder J' at the termination of the half H' its spring will snap it behind such shoulder, and when it moves upward again it will be obliged to enter and travel in the half G'.

The device would be operative without the provision of the shoulders I' J', and with a rigid rod or projection reciprocating in a straight line instead of the spring-pressed yielding plunger-rod E', but the provision of the shoulders and the employment of the spring-pressed rod insure its smooth and proper operation and are highly advantageous. The position of the yielding part or spring might of course be reversed by securing in the ends of the halves G' H' of the groove yielding springs having shoulders, and employing a rigid rod instead of the yielding rod E', the rigid rod in such case depressing the spring in the end of the half G' or H' as it passed over it and the spring then catching behind it to prevent it re-entering such half during its movement in the opposite direction, as will be readily understood.

From the foregoing description it will be seen that the reciprocating movements of the operating keys and swinging frame are converted into rotary motion in the cylinder F', the latter being given one complete revolution at each complete operation of a key, and it will be understood that by combining a ratchet and pawl with the cylinder in such manner as to prevent backward movement of it retrograde movement of an operated key when moving in either direction will be prevented until it has made a complete stroke in such direction, and thus the full and proper operations of the keys be insured Such ratchet and pawl may be applied to the cylinder either directly or indirectly. In the present instance I have formed ratchet teeth upon the upper end of the cylinder itself and pivoted a co-operating pawl K' upon the side plate of the framework, Figs. 1 and 11.

The second feature of my invention relates to a novel registering mechanism upon which the different values of the several keys in each bank are added into one common sum.

Pivotally hung to lugs upon the under side of the main cross-plate Y of the framework, beneath a large rectangular opening therein, is a backwardly and forwardly movable cam registering-frame L', Figs. 2 and 15. This frame consists of a curved plate provided at its upper corners with ears M' by which it is hung to the framework, and provided at its lower edge with a series of vertical slots N', one in line with each of the key-levers and in which the latter are adapted to play up and down.

Secured upon the forward side of the plate, one beside each slot N' and in this instance immediately to the left thereof, is a series of graduated cams O', while projecting from the side of each key-lever immediately in front of the adjacent cam is a stud P' covered by an anti-friction sleeve or roller adapted to engage the cam when the key is operated and swing the frame L' rearward. A coiled spring Q' connected to the frame L' pulls it forward and yieldingly holds it in normal position. The cams O' are of such graduated shapes that each key will move the frame L' a distance proportionate to the value of such key, the key representing 1 moving it one unit of distance; that representing 2 moving it two units, and so on through the series.

Rigidly fastened to the frame L' is an upwardly extending arm R' whose upper end is connected by a link S' to a forwardly and backwardly sliding plate T' mounted in guideways U' upon the upper side of the plate Y, Figs. 6 and 7. A pin V' upon the under side of this plate T' fits in a cam groove W' in the surface of a horizontal oscillatory drum or cylinder X' loosely mounted upon a shaft Y' journaled at its front and rear ends in brackets Z' supported by the frame plate Z.

The groove W' extends diagonally around, or part way around, the cylinder X', so that the graduated movements of the frame L' under the operations of different keys will be imparted to the cylinder X' through the medium of the arm R', link S', plate T', pin V' and groove W'.

Fast upon the shaft Y' in front of the cylinder X' is a gear $A^2$ having fast upon its rear side a ratchet $B^2$ Fig. 9 which is engaged by a spring-pawl $C^2$ upon the front end of the cylinder X', the result being that the cylinder will turn the ratchet and gear with it in one direction but not in the other. A holding pawl $D^2$ engaging the gear prevents backward movement of the gear and ratchet. The gear $A^2$ meshes with the pinion $E^2$ fast upon the rear end of a rotary shaft $F^2$ which has fast upon its front end a beveled pinion $G^2$, Figs. 7 and 10, which meshes with a second beveled pinion $H^2$ fast upon a rotary shaft $I^2$, which latter shaft forms the support for the transfer pinions of a register $J^2$ and has fast upon it the master wheel thereof.

The registering wheels $K^2$ are mounted upon a shaft parallel with the shaft carrying the pinion $H^2$, and are inclosed in a casing $L^2$ fastened upon the frame plate Y and having a hinged lid $N^2$ provided with sight openings above the respective wheels. The wheels $K^2$ are loose upon their shaft and capable of being slid to the left thereon, to disengage them from the respective transfer pinions and permit them to be separately turned to zero. When the lid is closed a lug $N^2$ upon its under side holds the train of registering wheels in their normal right hand position in engagement with their respective actuating and transfer pinions.

From the foregoing description it will be seen that the graduated movements of the registering frame L' are transmitted to the register and the values of the different operated keys added thereon.

The next feature of my invention relates to the indicating mechanism, and consists in a simplification of the means shown in the Koch patent No. 505,554 aforesaid for reciprocating the lifting frame by which the operated indicators are moved into view. As in that patent so in the present machine the indicators are secured to the upper ends of vertical rods $O^2$ passed through guide apertures in cross-plates $P^2$ $Q^2$ of the framework, Fig. 4, and capable of slight forward and backward movement at their lower ends. Each rod $O^2$ has secured to it near its lower end a curved spring $R^2$ whose upper end extends through the guide aperture in the plate $Q^2$, Fig. $3^a$, and when the rod is in the lower non-indicating position holds its lower end in forward position.

Confined in a housing $S^2$ on the rear end of each key lever is a spring plunger $T^2$, Fig. 16, which, when the rear end of the key rises, engages the indicator rod and tends to press the lower end of the rod rearward, the strength of the spring around the plunger $T^2$ being sufficient to overcome that of the spring $R^2$ and force the rod rearward when the latter is free to move.

Mounted to reciprocate vertically in guideways $U^2$, Figs. 2 and 4, is a lifting frame composed of two vertical end bars $V^2$ $W^2$ fitted in the guide-ways $U^2$; a transverse lifting bar $X^2$ secured at its opposite ends to the lower ends of the end bars $V^2$ $W^2$ and provided with a flange along its forward edge; and a transverse brace bar connecting the upper ends of the end bars. These end bars are provided upon their forward sides with vertical racks $Y^2$ $Z^2$, Figs. 3 and 5, which mesh respectively with pinions $A^3$ $B^3$ fast upon the opposite ends of a shaft $C^3$ journaled in the framework.

Fast upon the shaft $C^3$ at its extreme right hand is a third pinion (behind the pinion $C^3$ in Figs. 2 and 3) with which meshes a curved rack $E^3$, Fig. 6, rigidly fastened to the rear extension Z of the side arm Z of the swinging frame. The result of this arrangement of parts is that when the front end of any key lever is depressed and the swinging frame thereby lifted the indicator-lifting frame will be slid downward, and when the operated key and swinging frame are returned to normal position the indicator frame will be slid upward. Such being the case, the operation of the indicating mechanism is as follows: When the front end of a key-lever is depressed and its rear end lifted its spring-plunger $T^2$ will bear against the corresponding indicator rod $O^2$ and tend to force the lower end of said rod rearward. The downward movement of the lifting frame adjacent to the rear side of the rod will, however, permit only slight rearward movement of the rod until the bar $X^2$ of said frame passes below the lower end of the rod. During this downward movement of the lifter frame and upward movement of the rear end of the key lever, therefore, the spring-plunger of the latter will be forced into its housing and its spring put under tension. As soon as the lifter-bar $X^2$ clears the lower end of the rod the spring-plunger will throw the rod rearward and carry its lower end over the bar $X^2$. Upon the return upward movement of the lifter-frame, therefore, the bar $X^2$ will catch the rod $O^2$ of the operated key and carry it upward with it and maintain the indicator in exposed position until the frame is lowered by the operation of another key, whereupon the exposed indicator will drop out of sight, its spring $R^2$ throwing its lower end forward to normal position as soon as it is freed from the flange along the forward edge of the bar $X^2$.

In the Koch patent last referred to the lifting frame was actuated by a crank and pitman connection with a rotary shaft, which shaft was geared by a train of gears to a rotary member to which motion was imparted from the reciprocating movements of the swinging frame through a suitable mechanism for converting reciprocating into rotary motion. In the present machine such a shaft might be employed and be geared to the rotary cylinder, but the mechanism is much simplified under the construction I have shown by placing racks upon the lifting frame and another upon the swinging frame which is lifted by the keys, and simply interposing the oscillating pinions between them, so that the movement of one frame will cause a reverse movement of the other frame.

The next feature of my invention relates to the money-drawer and to means for preventing complete opening thereof until the operated key has been given a substantially complete positive stroke. When the drawer is in closed position it is locked by a latch arm $F^3$, Fig. 2, fastened at its front end upon a rock-shaft $G^3$ journaled at its opposite ends in the side frames of the machine, and engaging at its rear end a catch plate upon the rear wall of the drawer. Near its right hand end the rock-shaft $G^3$ has fast upon it a rearwardly extending arm $H^3$, Fig. 3, whose rear end rests upon or stands in the path of a cam $I^3$ fast upon a second rock-shaft $J^3$ also journaled at its opposite ends in the side frames of the machine. This shaft has fast upon it near its right hand end a pinion $K^3$ which meshes with a second pinion $L^3$ mounted upon a stud upon the side plate of the frame-work and meshing with a rack $M^3$ upon the lower end of the vertically sliding bar $C'$ heretofore referred to Fig. 6. When said bar is reciprocated by the operation of a key in the manner heretofore described the shaft $J^3$ will be oscillated back and forth and the cam $I^3$ caused to lift the arm $H^3$ and rock the shaft $G^3$ and lift the latch-arm $F^3$ out of engagement with the drawer.

Loosely mounted upon the shaft $G^3$ near its left hand end, Fig. 5, is a lever $M^4$ whose downwardly bent front end is adapted to be thrown into the path of a projection $N^3$ upon the side of the drawer when its rear end is lifted, a coiled spring $O^3$ yieldingly holding the lever in normal position. The rear end of the lever has secured upon its side a housing $P^3$, Figs. 17 and 18, in which is confined a spring-pressed plunger $Q^3$ whose outer end projects to the left of the lever into the path of a cam $R^3$ fast upon the rock-shaft $J^3$. When the front end of an operated key is partially depressed the turning of the shaft $J^3$ will cause the cam $R^3$ to lift the rear end of the lever $M^4$ and throw the front end downward into the path of the projection upon the drawer. When the key is fully depressed the shaft $J^3$ will be turned far enough to cause the cam to clear the end of the plunger and release the lever, whereupon the spring $O^3$ will restore the lever to normal position and permit the drawer to be fully opened.

The tail of the cam $R^3$ is beveled off as shown in Fig. 19, so that during its return movement it will force the spring-plunger laterally into its housing and not lift the rear end of the lever, and when the parts reach normal position the cam will clear the end of the plunger and the latter will spring outward into its path again, ready for the next operation.

For the purpose of automatically starting the drawer open at the operation of a key, and preventing re-engagement of the latch-arm with the rear wall of the drawer when the key is released, the vertically reciprocating bar $C'$ before described has fast upon its lower end a pendent plate $S^3$ having an inclined or beveled front edge which is adapted to engage a stud $T^3$ upon the side of the drawer when the bar $B'$ is lifted by the operation of a key and force the drawer slightly forward.

The gong-striker $U^3$ of the alarm gong $V^3$, Fig. 1, is actuated by a cam $W^3$ fast upon the shaft $J^3$ much in the same manner as the lever $M^4$ is actuated by the cam $R^3$. The gong-striker $U^3$ consists of a lever loosely hung upon a stub shaft $U^4$ supported by a bracket $U^5$ above the shaft $G^3$, Figs. 5 and 20, its curved front end carrying the striking head or hammer $X^3$ and its rear end carrying a housing $Y^3$ containing a spring-pressed plunger $Z^3$, similar to the plunger $Q^3$ before described, the outer end of which plunger $Z^3$ projects into the path of the cam $W^3$. When the shaft $J^3$ is turned rearward by the operation of a key the cam $W^3$ will ride over the end of the plunger $Z^3$ and depress the rear end of the lever $U^3$ against the resistance of a spring-plunger $A^4$ bearing against a shoulder upon the lever, and when the tail of the cam clears the plunger the lever will be thrown quickly back to normal position and the hammer $X^3$ caused to strike and sound the gong. During the return movement of the shaft $J^3$ and cam $W^3$ the beveled right side of the cam will force the plunger $Z^3$ to the right into its housing $Y^3$ and the lever $U^3$ will remain unmoved, and when the cam reaches normal position and clears the end of the plunger the latter will spring to the left again into the path of the cam.

In the Koch patents before referred to the shaft $J^3$ is a rotary instead of an oscillating one and the drawer-latch and gong-striker are actuated by cams upon it. Rotary motion could readily be imparted to the shaft $J^3$ in the present instance by gearing it to the cylinder $F'$, so that, as before stated, my novel means for converting the reciprocating movements of the keys into rotary motion in the cylinder has utility in other respects than as part of the key-controlling mechanism.

Having thus fully described my invention, I claim—

1. In a cash register and indicator, the combination of a series of operating keys, a movable frame common to said keys and moved by the operation of any one of them, means for coupling the operated keys to said frame, a vertically reciprocating slide actuated by said frame, a rotary cylinder mounted upon a vertical axis and provided with a cam groove composed of helical halves, a projection carried by the vertically reciprocating slide fitting in and co-operating with said cam groove, and a ratchet and pawl for preventing backward movement of the cylinder, substantially as described.

2. In a cash register or analogous machine, the combination of the swinging cam-frame provided with the series of graduated cams, the series of keys having projections co-operating with the respective cams, the oscillating cylinder provided with the helical groove, and the reciprocating slide connected to the swinging cam frame and having the projection fitting in the groove in the cylinder, substantially as described.

3. In a cash register, the combination of the swinging cam frame provided with the series of graduated cams, the series of keys having projections co-operating with the respective cams, the oscillatory cylinder provided with the helical groove, the reciprocating slide connected to the swinging cam frame and having the projection fitting in the groove in the cylinder, a rotary member, a ratchet and pawl connection between the cylinder and such member, to cause the cylinder to turn the member with it in one direction, and a register geared to the rotary member, substantially as described.

4. In a cash indicator, the combination of a series of indicators, a lifting plate or frame for moving the same to indicating position, a series of keys for moving the indicators into the path of said frame, a second frame common to and moved by the keys, and one or more oscillatory pinions intermediate and meshing with the racks upon the respective frames, whereby movement of one of the frames in one direction moves the other frame in the opposite direction, substantially as described.

5. In a cash register and indicator, the combination of a series of operating keys, a movable frame common to said keys and moved by the operation of any one of them, a rock-shaft oscillated by the movements of said frame at the operations of the keys, a money-drawer, a latch therefor, a cam upon the rock-shaft co-operating with the latch to release the drawer, an arresting lever, and a second cam upon the rock-shaft co-operating with said lever to throw it into the path of the drawer at the beginning of the stroke of a key and permit it to move out of the path of the drawer at the end of said stroke, substantially as described.

6. In a cash register or analogous machine, the combination of a reciprocating cam and an arm or lever carrying a spring-plunger projecting into the path of the cam parallel with the axis of the latter, said cam having an inclined or beveled side adjacent the end of the plunger, whereby the cam is adapted to ride under the plunger and vibrate the lever during its movement in one direction, and to force the plunger aside and allow the lever to remain stationary during its movement in the opposite direction, substantially as described.

7. In a cash register or analogous machine, the combination of an oscillatory cam, a lever provided at one end with a housing containing a laterally projecting spring-plunger, and a spring for yieldingly holding the lever in and returning it to normal position with the end of the plunger in the path of the cam, said cam having an inclined or beveled side adjacent the end of the plunger, whereby the cam is adapted to ride under the plunger during its movement in one direction and to force the plunger aside during its movement in the opposite direction, substantially as described.

ALBERT PFAFF.

Witnesses:
   HANEY CONOVER,
   JOSEPH P. CLEAL.